Jan. 26, 1932.　　W. J. COLLISON　　1,842,715
FLUSHING DEVICE
Filed March 5, 1931　　2 Sheets-Sheet 1
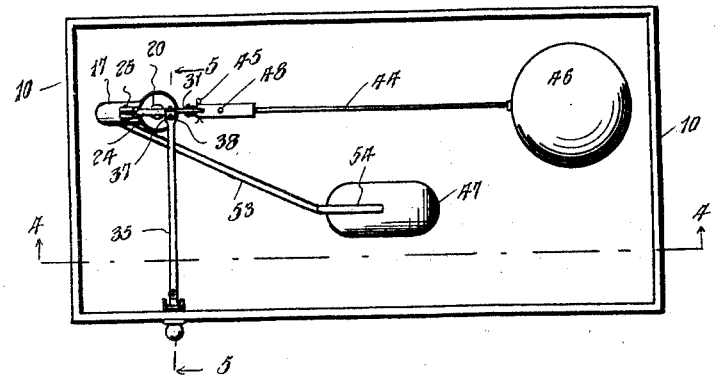
Fig. 1.
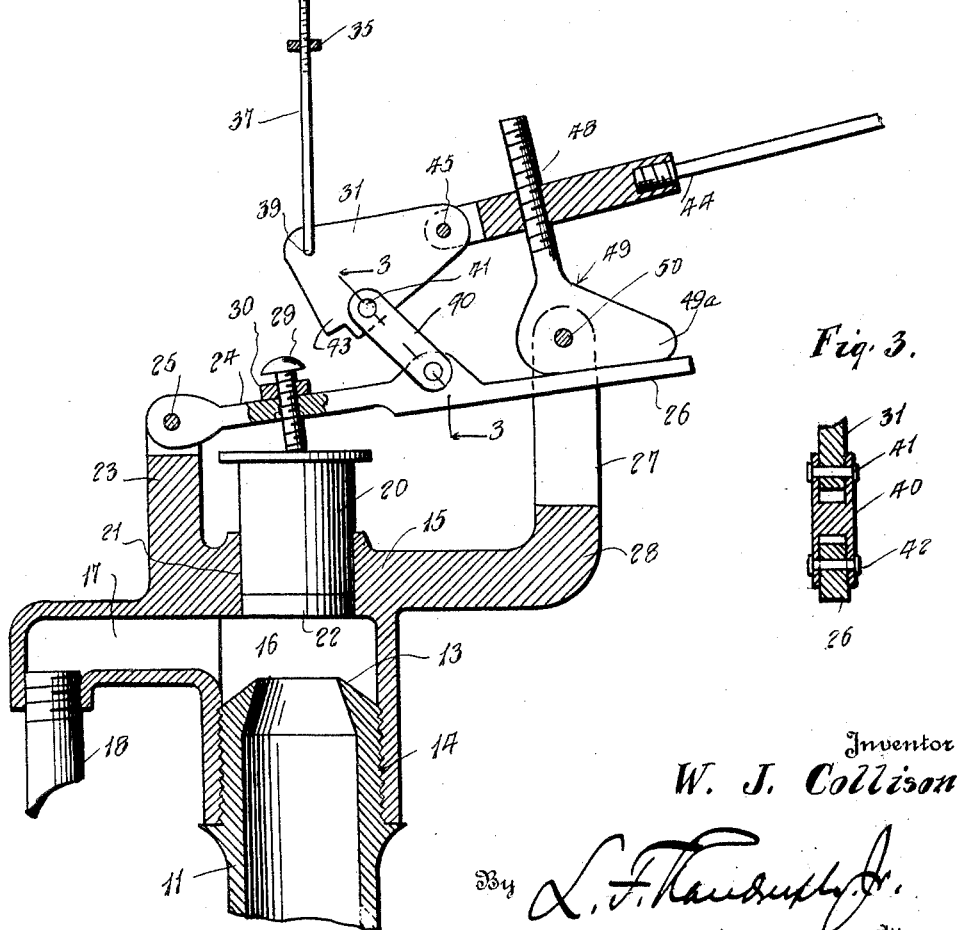
Fig. 2.
Fig. 3.
Inventor
W. J. Collison.

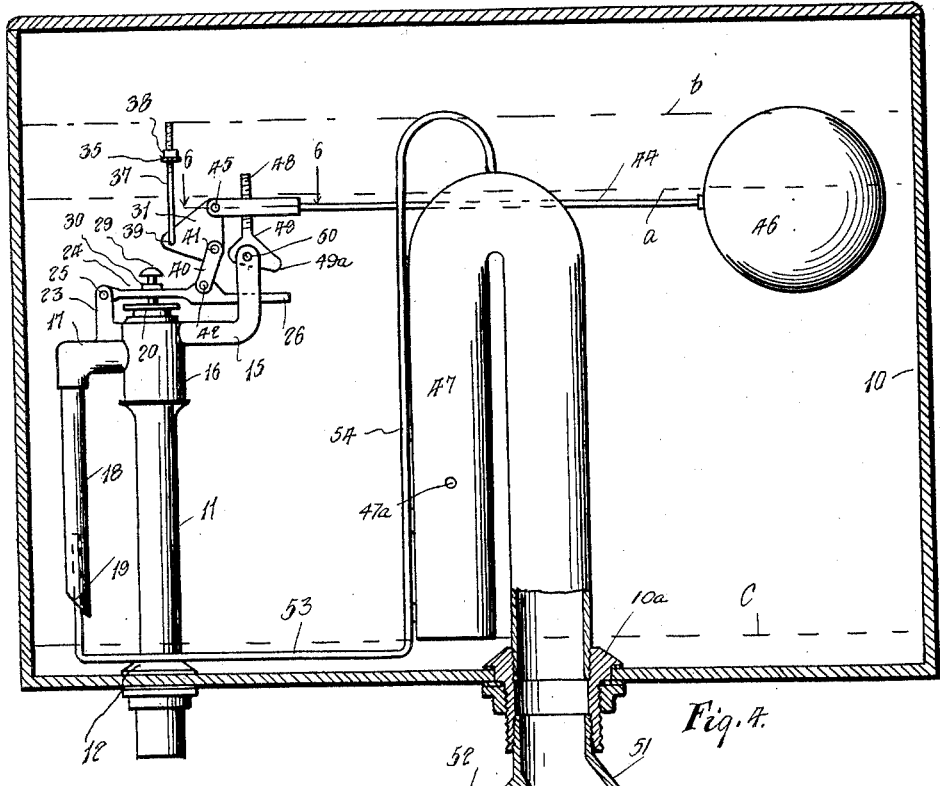
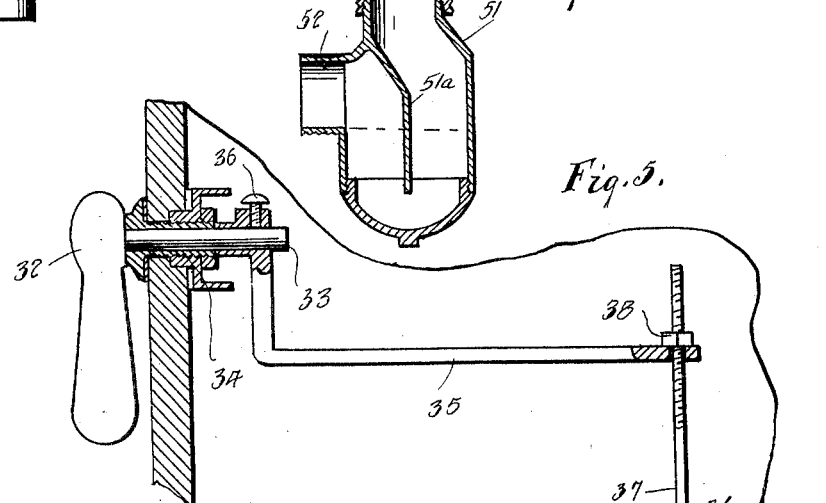
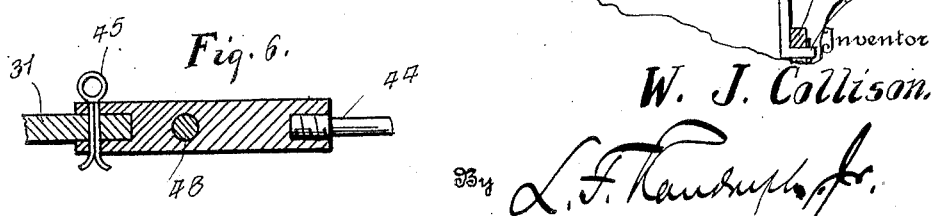

Patented Jan. 26, 1932

1,842,715

UNITED STATES PATENT OFFICE

WILLIAM J. COLLISON, OF BAKERSFIELD, CALIFORNIA

FLUSHING DEVICE

Application filed March 5, 1931. Serial No. 520,433.

This invention relates to a flushing device primarily for water closets.

It is aimed to provide a novel construction wherein positive operation is insured with practically all of the parts arranged for minute adjustment and wherein a trap is associated with the siphon tube.

The specific objects and advantages will become apparent from a consideration of the description following taken in connection with accompanying drawings illustrating an operative embodiment.

In said drawings:—

Figure 1 is a plan view of the invention,

Figure 2 is an enlarged vertical sectional view of the water inlet pipe and associated structure, Figure 3 is a detail taken on the line 3—3 of Figure 2, Figure 4 is a cross sectional view taken on the line 4—4 of Figure 1, Figure 5 is a cross sectional view taken on the line 5—5 of Figure 1, and Figure 6 is a cross sectional view taken on the line 6—6 of Figure 4.

Referring specifically to the drawings, 10 designates a flush box or tank such as is used in connection with water closets and which may be of any suitable material, design and capacity.

The water supply pipe is shown at 11, entering the bottom of the tank at a water-tight joint 12. The outlet of pipe 11 is formed into a valve seat 13 and about the same screw threads 14 are provided onto which a bonnet 15 is screw threaded. Such bonnet provides a chamber or passageway 16 from which a tube 17 leads laterally, having a discharge tube 18 threaded into the same, and diagonally cut off at its discharge end 19. A plunger valve 20 is vertically slidable in a bore 21 of the bonnet and has a rubber or other gasket forming a head at 22, which is normally engaged with the seat 13 to cut off the supply of water to the tank.

An arm 23 integral with the bonnet, has a lever 24 pivoted thereto at 25, the free end 26 of which extends through a bifurcation 27 of another arm 28 integral with the bonnet 15. Lever 26 has a screw 29 adjustably mounted thereon and adapted to be secured in adjusted position by a lock nut 30. Screw 29 bears against the valve 20 and its adjustment will serve to position and limit the movement of the valve and to position adjacent parts.

A substantially triangular toggle is employed at 31 which is adapted to be tripped from the position shown in Figure 1 to that in Figure 2, through the rocking of a handle 32 located exteriorly of the tank. Such handle has a shank 33 suitably journaled in a bearing construction 34 in the tank, and which shank has a crank 35 detachably secured thereto at 36. The crank 35 has a rod 37, adjustably secured thereto at 38, and pivotally connected at 39 to the toggle. Such toggle also has a link 40 pivoted thereto at 41 and which link is pivoted at 42 to the lever 24. Toggle 31 has a shoulder 43 provided by notching one corner thereof, which shoulder in the normal position of the device, abuts the toggle. An arm 44 is pivoted at 45 to the toggle 31 and carries a usual ball float at 46.

Adjustably screw threaded to the rod 44 is the shank 48 of a control member 49, which is pivoted at 50 to the arm 28 and which carries a cam or foot 49ª.

Disposed within the tank 10 is a U-shaped siphon tube 47 having a vent 47ª therein. Such tube at one end is secured in a watertight coupling 10ª engaging the wall of the tank 10 and which supports below the tank, a trap 51, having a baffle 51ª therein, and also having a nipple or connection at 52, for connection with a pipe leading to the water closet bowl to be flushed.

A refill tube for the trap 51 is shown at 53, one end extending into the tube 18, and the other end communicating with the interior of the siphon, the tube being soldered or otherwise fastened as at 54 to the siphon tube.

Through the adjustment provided by the shank 48, the height of the water level within the tank may be varied or adjusted and also through such adjustment, the cam or eccentric 51 serves to insure self-closing of the valve where a careless installation may have occurred.

In the operation of the device, the water is flushed from the tank 10 by siphonage through the two traps 47 and 51, with an air pressure seal between such traps.

Presuming operation and starting with the tank 10 empty, the water enters the same through valve seat 13, chamber 16, passage 17 and pipe 18 filling the same, until the float 46 cuts the water off at the level indicated by line $a$. During this action, the water closet bowl is primed and filled with water and also the trap 51 is filled with water, such priming and filling occurring through the tube 53. The tank is now ready to flush and to accomplish this purpose handle 32 is tilted which causes crank 35 and rod 37 to move the toggle 31 to the position of Figure 2, allowing plunger 20 and associated parts to rise and open the valve seat 13 as shown in Figure 2, whereupon the water rises to the level of line $b$, at which level, the sealed air in the siphon is forced out through the trap 51 and outlet 52, and the flushing takes place and continues to flush until the tank is empty to the water level $c$.

It will be noted that the refill tube 53 extends to the highest water level to prevent a continuous running of the water and also extends to the lowest water level to insure a perfect air seal.

The showing of the trap 51 is to be taken as conventional since the same according to preference and desires of the trade, may be cast, molded, baked or manufactured according to any desired method and in fact the same may, if desired, be integral with the tank 10 and may also be molded into and made integral with any type of water closet bowl.

Various changes may be resorted to provided they fall within the spirit and scope of the invention.

What is claimed is:—

1. A flush valve construction comprising a bonnet adapted to seat on a supply pipe, a pipe controlling valve carried by the bonnet, a lever pivoted to the bonnet and in engagement with the valve, a float valve means adapted to be tripped, said float valve means being connected to said lever, and a control member connected to said float valve means having cam engagement with the said lever, said control member being pivoted to said bonnet.

2. A flush valve construction comprising a bonnet adapted to seat on a supply pipe, a pipe controlling valve carried by the bonnet, a lever pivoted to the bonnet and in engagement with the valve, a float valve means adapted to be tripped, said float valve means being connected to said lever, and a control member connected to said float valve means having cam engagement with the said lever, said control member being pivoted to said bonnet, said control member having screw thread adjustment with said float valve mechanism.

3. A flush valve construction comprising a bonnet, a valve carried thereby for engagement with a supply pipe, a lever pivoted to the bonnet and engaged with said valve, a toggle adapted to be tripped, a link connecting said toggle to said lever, a float valve member pivoted to the toggle, a control member screw threaded adjustably to said float valve member, said control member being pivoted to the bonnet and having a cam engaging said lever.

In testimony whereof I affix my signature.

WILLIAM J. COLLISON.